Fig. 1.

June 7, 1938.  W. T. BAILEY  2,119,980
BOX MACHINE
Filed May 17, 1937  6 Sheets-Sheet 2

INVENTOR.
Walter T. Bailey

BY
Cornelius D. Ehret
ATTORNEY.

June 7, 1938.  W. T. BAILEY  2,119,980

BOX MACHINE

Filed May 17, 1937  6 Sheets-Sheet 3

INVENTOR.
Walter T. Bailey
BY
Cornelius L. Estet
ATTORNEY.

Fig. 12.

| | 0° | 40° | 80° | 120° | 160° | 200° | 240° | 280° | 320° | 360° |
|---|---|---|---|---|---|---|---|---|---|---|
| NO. 2 MAIN | Moving down | | | Dwell for Turn-tre & Sq. Pr. | Dwell for Hard press. | Moving up | | Dwell in UP position | | |
| NO. 2 AUX. | Moving down | | Mov'g up | Mov'g down | Dwell down | Moving up | | Dwell in UP position | | |
| CARRIAGE | Dwells at No. 2 Station | | Moves toward #1 Station | | | Dwells at #1 Stat. | Dwell Lap Mov. at C.L. | Moves toward #2 Station | | |
| NO. 1 MAIN | Dwells in UP position | | | | | Moves down | Dw. for C.L. | Moving up | Dwells in UP pos. | |
| NO. 1 AUX. | Dwells in UP position | | | | | Moves down | Dwells for Stripp. | Moves up | Dwells in UP pos. | |
| NO. 1 LOWER | Dwells in UP position | | | | | At rest in Down pos. | Down with #1 M. Cam | Dwells Moves Locks Rest | Moves up under Cam Cont. AT REST | Dwells up |
| SIDE BRUSH | At rest in UP pos. | | Moves down | | | | | Depresses Lower Form Moves up | At rest in UP position. | |

Patented June 7, 1938

2,119,980

UNITED STATES PATENT OFFICE 2,119,980

BOX MACHINE

Walter T. Bailey, Philadelphia, Pa., assignor to Stokes and Smith Company, Summerdale, Philadelphia, Pa., a corporation of Pennsylvania Application May 17, 1937, Serial No. 143,012

28 Claims. (Cl. 93—54.2)

My invention relates to apparatus for covering previously formed or stayed boxes by applying thereto sheet material, such as a wrapper, label or the like, or for forming a box from a single or multi-piece blank by applying thereto sheet material, as a tabbed or untabbed wrapper, or tabs solely, to hold the box elements in box-forming position.

In accordance with my invention, the apparatus comprises two reciprocating form blocks with which there are associated respectively tools for performing supplemental sheet-applying operations, and for each cycle of the machine a carriage reciprocates in a path intercepting the paths of the form blocks to transfer partially formed or wrapped box structure stripped from one of them into the path of the other for supplemental sheet-applying operations; more specifically, upon the carriage are mounted corner-lap folding tools which move toward each other to perform a corner-lap folding operation when the carriage is in, or approaches, its box-receiving position in the path of one of the form blocks, and which are moved away from each other as the carriage moves to that position; more specifically, the carriage serves to eject from the machine the completed box stripped from the other of the form blocks.

My invention further resides in the features of construction, combination and arrangement hereinafter described and claimed.

For an understanding of my invention, and illustration of a preferred form thereof, reference is to be had to the accompanying drawings, in which.

Figure 1:
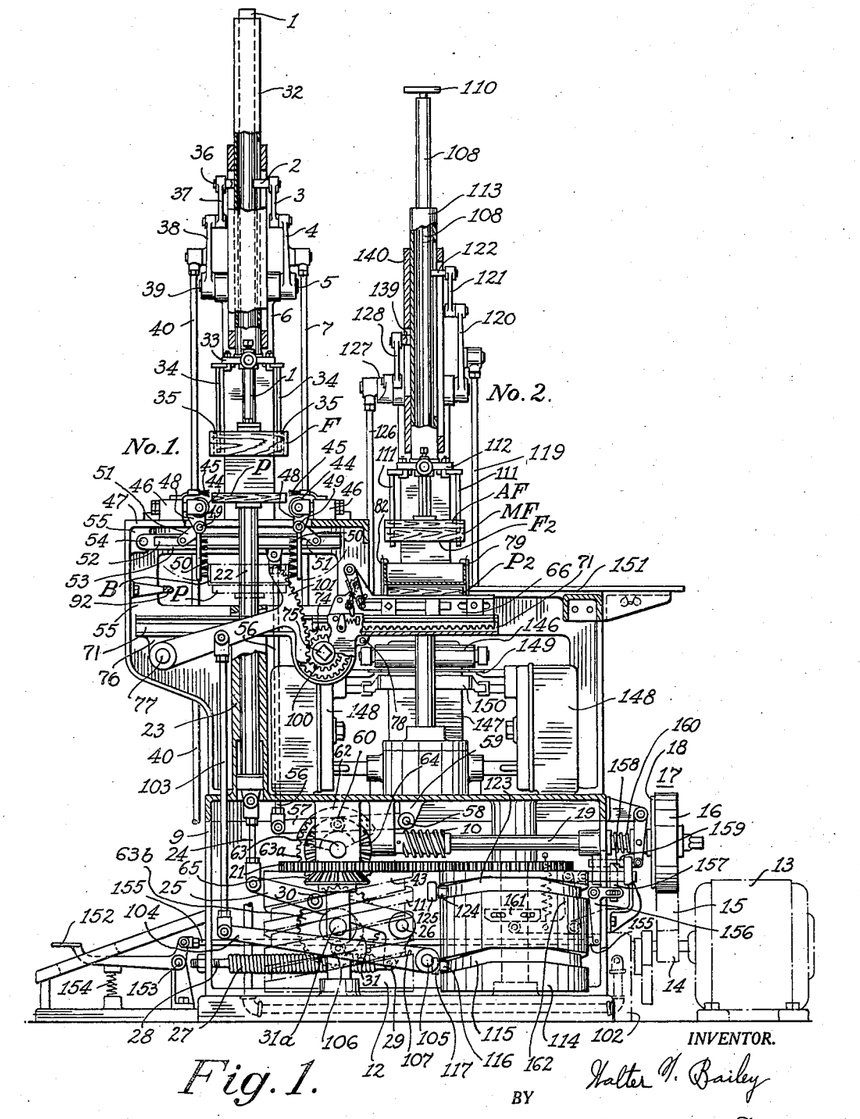
Fig. 1 is a side elevational view, with parts in section and parts omitted, of a box machine.

Referring to Fig. 1, at station No. 1, the form block F is attached to the lower end of a plunger 1 from which extends a stud 2 connected by link 3 to a lever 4 pivotally connected at 5 to the frame member 6 of the machine. The rod 7 pivotally connected at its upper end to lever 4 is connected at its lower end to lever 8 (Fig. 6) projecting from the housing 9 at the base of the machine. The lever 8 is pivoted to a stationary member within the housing 9 and is provided with a cam follower for engaging the peripheral groove 11 (Fig. 1) of a cam 12 which makes one revolution for each cycle of the machine. Cam 12 is driven from the motor 13 by pulley 14, belt 15, and driving member 16 of a one-time clutch 17 whose driven member 18 is secured to shaft 19. The worm 10 (Fig. 6) on shaft 19 drives the gear 20 on the same shaft as gear 20a which is in mesh with the gear 21 secured to the cam 12 or its shaft.

For each revolution of cam 12 the form block F moves from its box-receiving position shown in full lines in Fig. 1, down to the dotted line position of the same figure, and thence back to its original position. As appears from Fig. 12, after the caption "No. 1 main", the form block F does not descend immediately upon beginning of the machine cycle but, on the contrary, remains in its "up" or box-receiving position for a prolonged period facilitating disposition thereon of a box structure, for example, a box or box blank B to which is adherent a partially applied wrapper W, such as shown in Fig. 13. The wrappers may be tabbed as indicated by tabs t; or the wrapper may be omitted, in which event the tabs are of the type shown in Stokes U. S. Patent #1,826,264, Fig. 11.

The length and width of the form block F correspond to the inside dimensions of the box to be made, but the depth of the form block may be suitably large to accommodate a range of boxes of the same length and width but of different depths.

As the form block F moves downwardly from the position shown in full lines in Fig. 1, it meets the lower form or platen P to clamp the box structure or assembly between the two form blocks F and P.

The platen P is disposed on the upper end of a plunger 22 guided by the tubular member 23 extending upwardly from housing 9. A link 24 connects the lower end of the plunger 22 to the bell-crank lever 25 pivoted at 26 to the frame of the machine. The spring 27 connected at one end, as by bolt 28, to housing 9, and at its other end to arm 29 of lever 25, biases the plunger to its uppermost position shown in full lines in Fig. 1. The lever 25 carries the cam follower 30 for cam 31 on shaft 31a driven in timed relation to cam 12 by gears 65, 64, shaft 63 and gears 63a, 63b.

Figure 12:
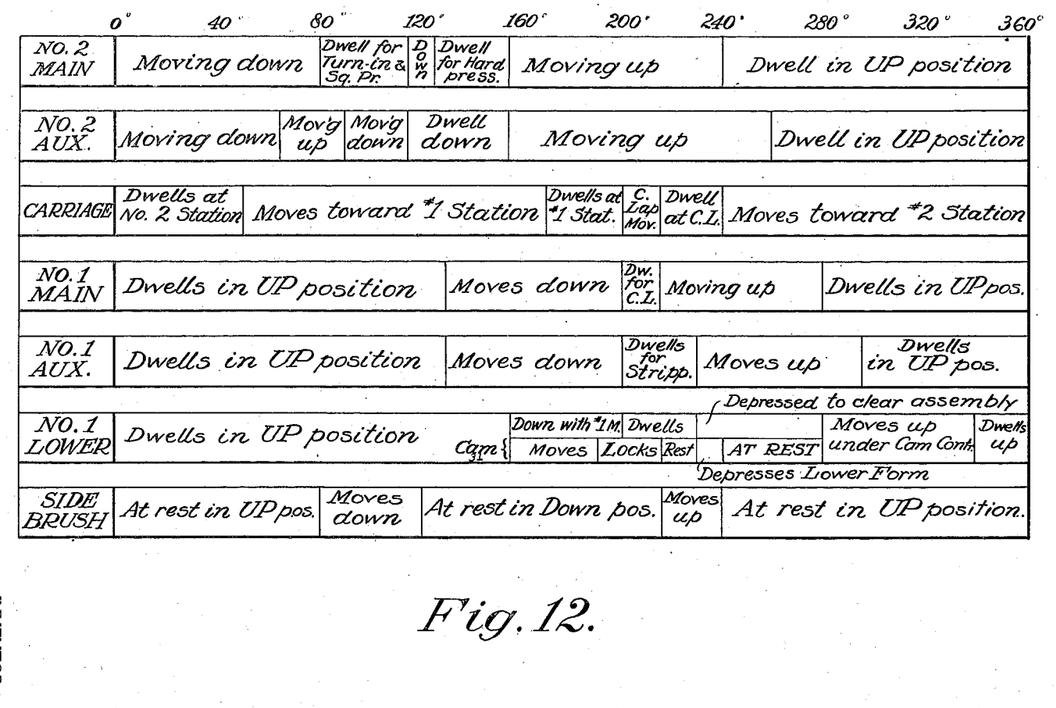
Fig. 12 is a timing chart referred to in description of the operation of the machine.
Figures 13, 14, 15, 16, 17, 18, 19:
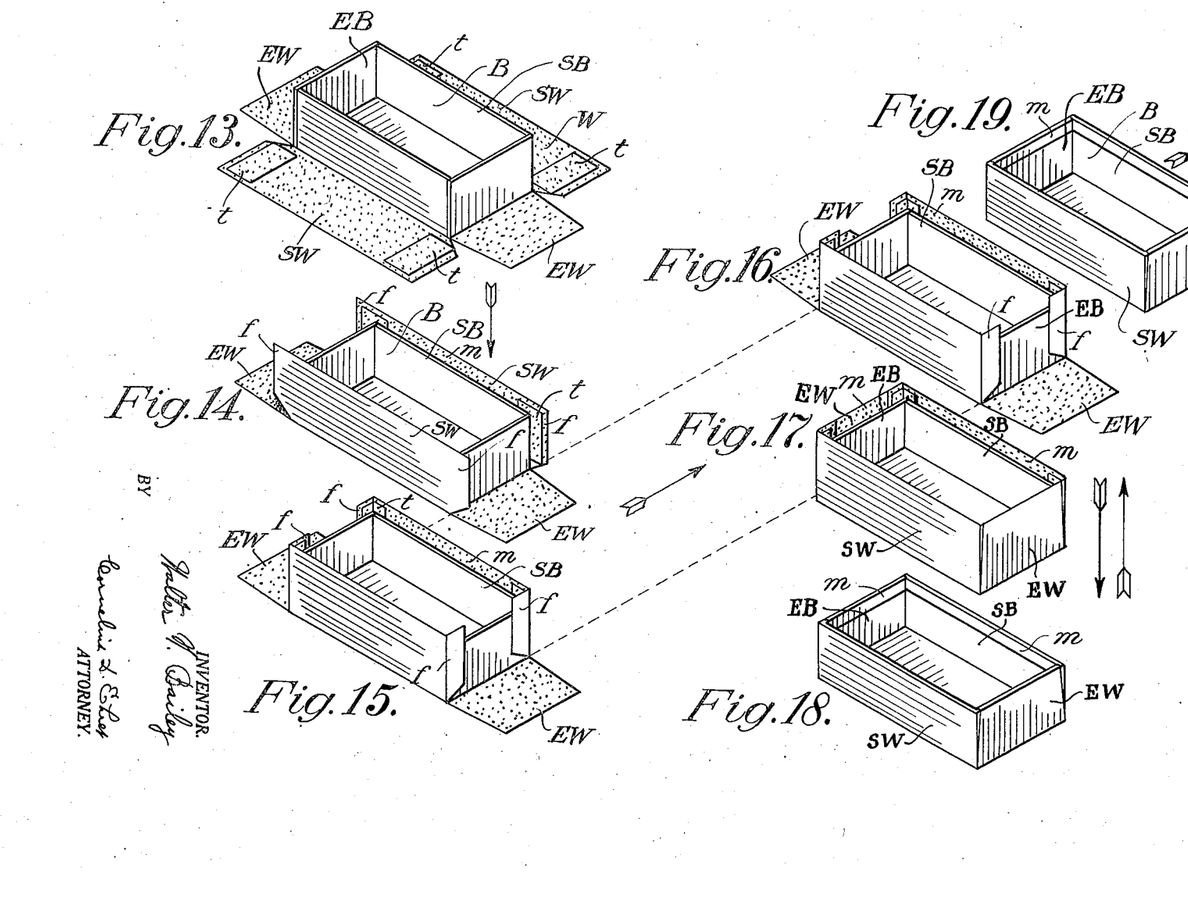
Figs. 13 to 19, in perspective, illustrate the successive sheet-applying steps performed by the machine.

The cam 31 is so shaped that the platen or lower form P, during a cycle of the machine, moves as appears in Fig. 12 after the caption "No. 1 lower".

The auxiliary plunger 32, which is hollow and serves as a guide for the main plunger 1, carries at its lower end cross-bar 33 to which are adjustably secured the stripper rods 34, 34 extending through holes 35, 35 in the form block F. From the auxiliary plunger 32 extends a pin 36 serving as a pivotal connection for link 37 connected to lever 38 pivoted at 39 to frame member 6 of the machine. The rod 40, connected at its upper end to lever 38, is connected at its lower end to lever 41 projecting outside of the housing 9, Fig. 6. Lever 41 is pivotally mounted within the housing 9 and carries the cam follower 42 which rides in the groove 43 of cam 12.

For each revolution of cam 12, the auxiliary plunger 32 reciprocates from, and back to, the full line position of Fig. 1. As appears from Fig. 12, after the captions "No. 1 main" and "No. 1 aux.", the main plunger carrying the form block F and the auxiliary plunger carrying the stripper rods 34 move downward concurrently, but the main plunger begins its upward movement before the auxiliary plunger with the result the stripper rods hold the box against the platen P in dotted line position, Fig. 1, for some time after the form F has begun its upward or reverse movement; specifically, the strippers 34 remain in their lowermost position, projecting through the holes 35 in the form block, until the form block F is out of the box B.

As the form block moves downwardly adjacent the side-folding tools, specifically rolls 44, 44 and brushes 45, 45, the side panels SW of the wrapper W are by them wiped into adhesive engagement with the side panels SB of the box or box blank, Fig. 14.

The side rolls 44, 44 and brushes 45, 45 are mounted upon the slides 46, 46 which are adjustably secured to the table member 47 of the machine, their adjustment varying for boxes of different width.

To the tool slides 46 are attached the bracket members 48 for supporting shafts 49 to which are secured the brushes 50 disposed on opposite sides of the form block and having substantial extent in its direction of movement. To the shafts 49 are also secured the arms 51 having projections which engage the slot 52 extending lengthwise of lever 53 pivoted at 54 to the frame member 55 of the machine. The link 56 is connected at its upper end to lever 53, and at its lower end is connected to the lever 57 pivoted at 58 to the bracket 59 depending from the top of the housing 9. Intermediate its ends the lever 57 carries a cam follower 60 for engagement with the groove 61 of cam 62, Fig. 6, on shaft 63 driven through the gears 64 and 65, and making one revolution for each revolution of cam 12.

The timing of the brushes 50 is shown in Fig. 12, caption "Side brush." As the form block carries the box and wrapper assembly to the dotted line position of Fig. 1, the brushes are in the position shown in Fig. 1 for the purpose of holding the side walls of an unstayed box blank against the form block after the form has passed beyond the rolls 44, 44.

Somewhat before the form block F, platen P and the partially wrapped or formed box structure reach the position shown in dotted lines, in Fig. 1, the transfer carriage 66, shown in detail in Figs. 7–10, moves to box-receiving position in the path of the form block. The carriage 66, as more clearly appears in Fig. 2, comprises two slides 67, identical in construction and disposed on opposite sides of the form block; since the construction of the slides is identical, but one of them is specifically described.

Figures 7, 7A, 8, 8A, 9, 9A, 10, 11:
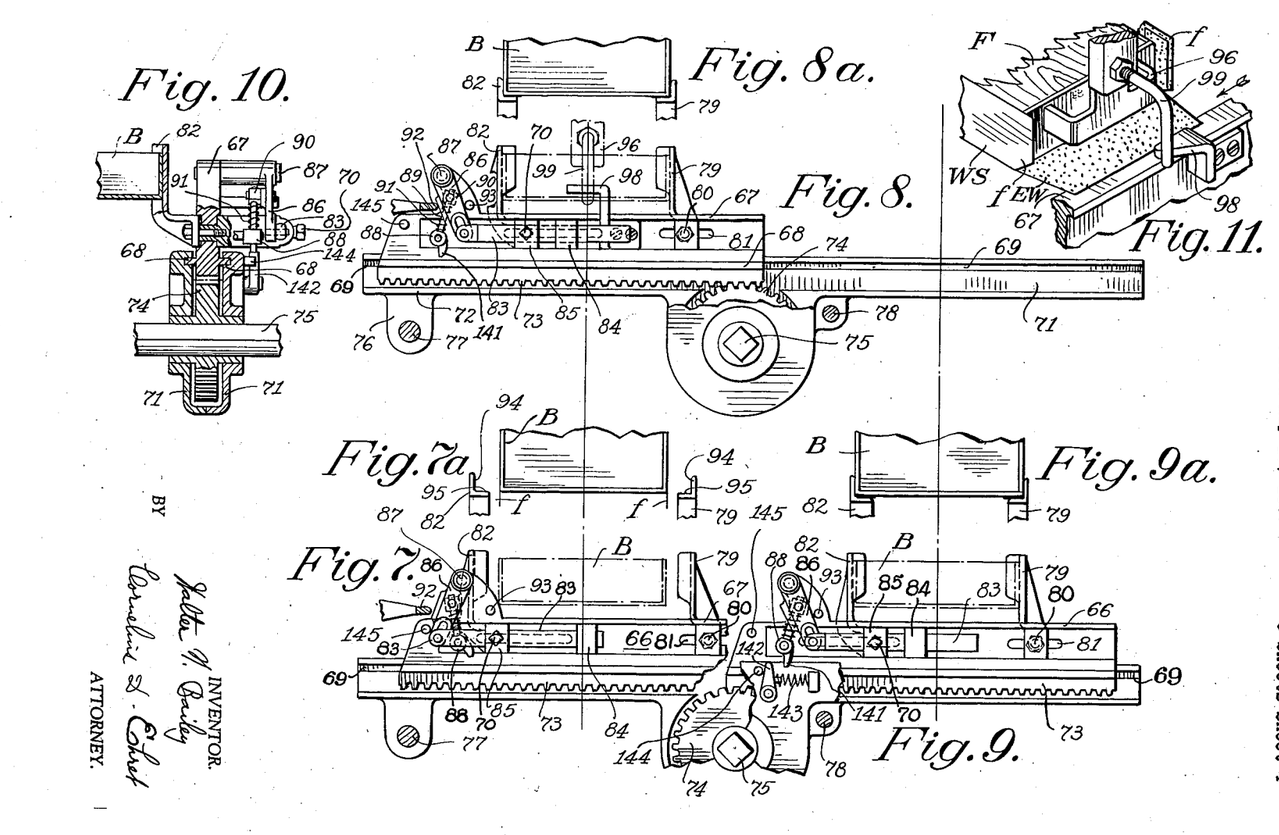
Figs. 7, 8 and 9 illustrate, on enlarged scale, the transfer carriage shown in Fig. 1 in various operating positions.
Figs. 7a, 8a and 9a are plan views showing various positions of tools appearing in Figs. 7, 8 and 9.
Fig. 10 is a detail view, in section, of part of the carriage mechanism.
Fig. 11, in perspective, shows release mechanism for box holders of Fig. 4.

The carriage slide 67 in cross-section, as shown in Fig. 10 is an elongated bar structure from which extend on opposite sides the projections or ribs 68 received by the guide grooves 69 of an elongated two-piece housing 71, disposed below the limit of travel of the form block and extending at right angles to its path of movement. Attached to or integral with the under side of the carriage member 67 is a rack 73 which is in mesh with a gear 74 on shaft 75 extending transversely of the machine.

Figure 5:
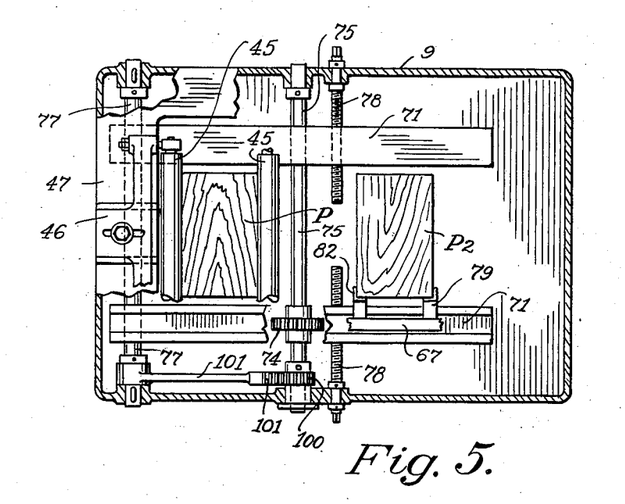
Figs. 5 and 6 are top plan views of parts appearing in Fig. 1.

Each of the split housings 71 is provided with a bracket 76 which loosely receives a guide bar 77 extending parallel to shaft 75, and each of the split housings threadably receives an adjusting screw 78 projecting externally of the machine (Fig. 5) and suited to receive a crank or other member for adjustment of the two components of the carriage, and their associated guiding and driving means, toward and away from each other to suit various sizes of boxes. Each of the gears 74 within housing 71 is slidable with respect to, but rotatable with, shaft 75 which, for simplicity, is made square or noncircular to avoid need for keys.

Each of the slides 67, as viewed in Figs. 7–9, carries adjacent its right-hand end an adjustably fixed box-holding member 79. To suit a given size box, the holders 79 are adjusted by loosening nut 80 threaded on a bolt which passes through a slot 81 in the slide 67, moving the member 79 to the proper position, and then retightening the nut 80. Upon each slide 67 is also mounted a movable box holder 82 carried by block 85 adjustably secured to the reciprocable link 83 which slides through block 84 fixed to or integral with slide 67. The block 85 is received by a groove in the slide 67 and also functions as a guide member. The link 83 has a pin and slot connection with the toggle-lever 86 pivotally mounted on pin 87 extending from that side of slide 67 more remote from the form block. The holder 82 is adjustable with respect to link 83, to suit boxes of different widths; bolt 70 which clamps block 85 to link 83 permits this adjustment.

Upon each of the slides 67 is pivotally mounted a member 88 from which extends the rod 89 slidably received by the block 90 pivotally mounted on toggle-lever 86. The spring 91 encircles rod 89 and bears against the member 88 and block 90.

As carriage 66 moves from right to left toward the path of form block F, the distance between the stationary box-holding members 79 and the relatively movable box-holding members 82 is substantially greater than the width of the box to be received by the carriage (Figs. 7, 7a). Just before the carriage reaches its box-receiving position, the fixed stop structure 92 engages lever 86 (Fig. 7) so that for further movement of the carriage to the left, the box holders 82 are moved by the stop to the right with respect to the carriage, the toggle members 86, 89 of each slide 67 finally snapping from the position shown in Fig. 7 to the position shown in Fig. 8 defined by the stop 93 to lock the holding member 82 in the latter position.

At this time, the movement of the carriage has so far progressed that the box holders 79 are in engagement with one end of the box B on form F, and the box holders 82 are in engagement with the left-hand end of the box (Figs. 8, 8a). The members 79, 79, 82, 82 are so shaped that in moving to the box-holding position, they turn the flaps f, Fig. 14, extending from the side panels of the wrapper beyond the ends of the box into adhesive engagement with the ends of the box, Fig. 15; specifically, each of the members 79—82 is provided with one face 94 for engaging the side wall of the box adjacent the corner, and with a face 95 at right angles thereto which engages a projecting flap f of a wrapper side panel and wipes it into engagement with the box end (Fig. 15).

After this corner-lap operation has been performed by the box-holding members or corner-lap tools 79, 79, 82, 82 of the carriage, the form block F moves upwardly, as previously described, the stripper rods 34, 34 remaining down, to strip the partially wrapped box or box blank B from the form block F which, as shown by the timing chart of Fig. 12, remains at rest for a short period during the corner-lap folding operation. Before the carriage moves away from this position, the brushes 58, 58 are swung upwardly in opposite directions to clear the carriage path and remain in retracted position until, in the next cycle of the machine, the carriage returns to position below the form block F to receive another assembly.

Figures 2, 3, 4:
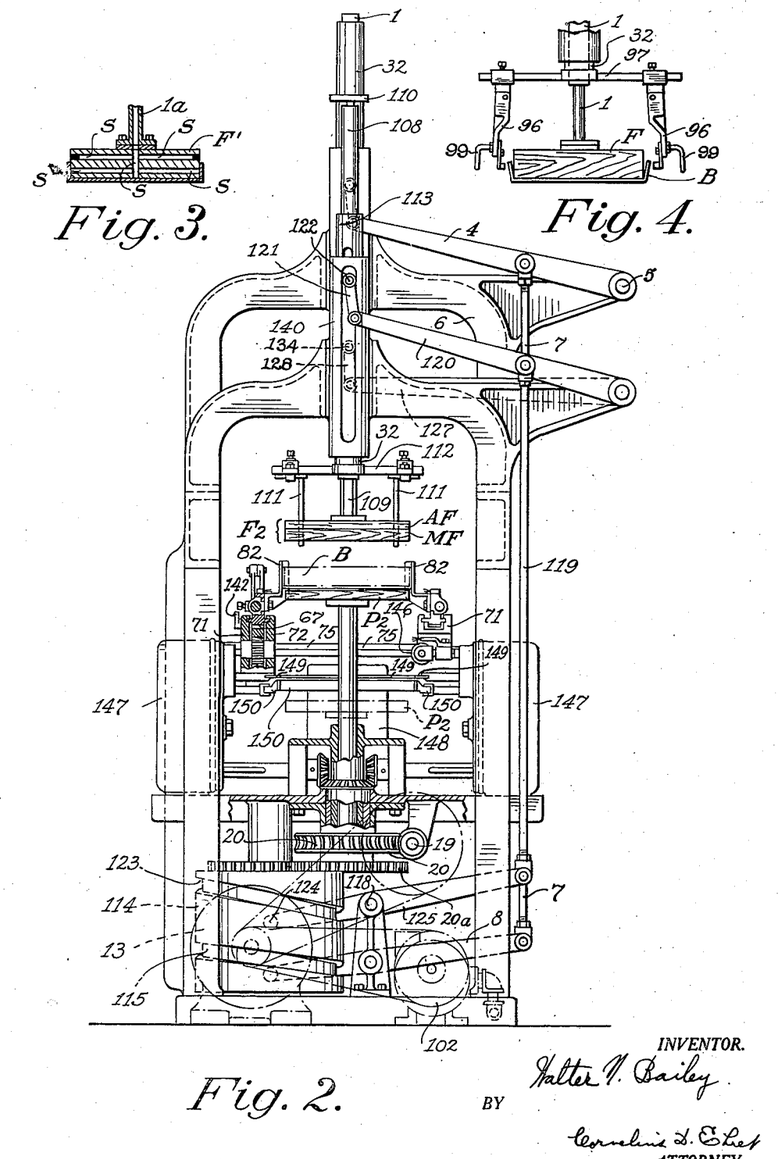
Fig. 2 is a rear elevational view, with parts omitted and parts in section, of the machine shown in Fig. 1.
Figs. 3 and 4 are detail views, on enlarged scale, illustrating modifications of form block structure shown in Fig. 1.

For holding the end walls of an unstayed blank against the form block during its movement from box-receiving position to the transfer position, there may be utilized box holders 96, 96, such as shown in Fig. 4, and more fully shown and claimed in United States Letters Patent #2,094,455 to Lange. These box holders are carried by the bar 97 at the lower end of the auxiliary plunger 32; they are moved toward each other upon downward movement of the form block from the position shown in Fig. 1, to clamp the end walls of the box blank against the form block F by mechanism of the type shown in aforesaid Lange patent. The holders 96, 96 are, in my machine, released substantially concurrently with engagement of the box structure by the corner-lap tools 79, 82 on the carriage; specifically, each of the slides 67, as shown in Fig. 11, carries a cam member 98 so adjusted that substantially concurrently with movement of the corner-lap tools to engage the box structure, the cam 98, by engagement with the hook member 99 on the end holding tool 96, swings this tool away from the form block. These box-holding tools 96 then remain in their retracted position during return movement of the form block to box-receiving position.

For stayed boxes, unstayed box blanks or multi-piece blanks of type shown in Stokes U. S. Patent #1,796,630, there may be utilized the suction type form block F', Fig. 3, generally similar to that disclosed and claimed in Rider application Serial No. 86,221, filed June 20, 1936. The suction passages S in the block terminate in ports in the faces of the block and are in communication with the hollow member 1a, which may be the main plunger. Pump 102, Figs. 1 and 2, driven by motor 13, supplies the suction; the aforesaid Rider application illustrates valve mechanism which may be used for controlling or timing the application of suction; in brief, suction is cut off after the corner-lap operation or before stripping of the box from form F and is re-established at or about the time the ascending form block F reaches the rolls 44. When the box walls are of height insufficient to cover the upper ports, these ports may be temporarily plugged to avoid loss of suction, as indicated in Fig. 3.

Use of the suction type form block permits the operator to place an assembly—stayed box, box blank, or component of a blank, and adhering sheet material—on the form block at any time during its period of accessibility and then immediately to be free to prepare the next assembly. This period begins approximately when the form F' in ascending clears the brushes 45 and continues until the form in descending is so close to platen P a box cannot be inserted between forms F and P.

As appears from Fig. 12, after the caption "No. 1 main" the period of accessibility when form F is used with mechanical box holders is roughly about 200° of the machine cycle and with the suction form block this period is even longer. This long period of accessibility per cycle permits continuous operation of the machine at high speeds, for example, substantially in excess of thirty boxes per minute and yet affords the operator ample time in each cycle to place an assembly on the form block. Because of the prolonged period of accessibility, the operator is afforded considerable leeway in timing her movements necessary for preparation of the assembly because it is not essential that the assembly be prepared and ready to be placed on the form at a critical or brief period of the machine cycle.

Reverting to operation of the mechanism, before the carriage 66 begins to move from station No. 1, the platen P, by means of cam 31, is moved slightly downward and remains in this depressed position until the carriage moves clear of the platen; the cam 31 thereupon effects or permits upward movement of platen P to its original, or full-line position, of Fig. 1. The timing of platen P is shown in Fig. 12 after the caption "No. 1 lower".

After the carriage 66 has received a partially wrapped box or box blank, it is moved to the position shown in Fig. 1 by rotation of shaft 75 to one end of which is secured gear 100 (Figs. 1 and 5) in mesh with the gear sector 101 pivoted on bar 77 and oscillated, in proper timed relation to the movement of the form block F, by the link 103 connected at its lower end to lever 104 pivoted at 105 to the frame of the machine and carrying a cam follower 106 riding in the groove 107 of cam 12. Movement of carriage 66 to the right continues until the box structure is in the path of the form block structure F2 at station No. 2 (Fig. 1).

As appears from Fig. 12, (after the caption "Carriage"), the machine cycle begins and ends with carriage 66 in the path of the form block F2 at station No. 2.

The form block F2 is comprised of two components; the main component MF is attached to the lower end of the main plunger 108, and the auxiliary or upper component AF is connected to the rod or plunger 109 which extends through plunger 108 and at its upper end is provided with a stop plate 110. The stripper rods 111 which extend through aligned components in both the upper and lower components of the form F2 are carried by the bar 112, secured to the lower end of the auxiliary plunger 113; the construction and operation of these three plungers is, in general, similar to that shown in Federwitz et al. U. S. Patent #1,541,255.

Movement of the main form MF is controlled by cam 114 having therein a cam groove 115 which receives the cam follower 116 at one end of lever 117 pivoted at 118 within the housing 9, and extending outside of the housing there pivotally to connect to the link 119 whose upper end is pivotally connected to lever 120 connected by link 121 to the pin 122 which extends from the main plunger 108 through a slot in the auxiliary plunger 113.

Similarly, cam 114 is provided with a groove 123 which receives the cam follower 124 on lever 125 which extends outside of the housing 9 and there pivotally connects to the lower end of link 126 whose upper end is connected to lever 127, in turn connected through link 128 to the pin 139 extending from the auxiliary plunger 113 through a slot in the sleeve or stationary guide 140.

Figure 6:
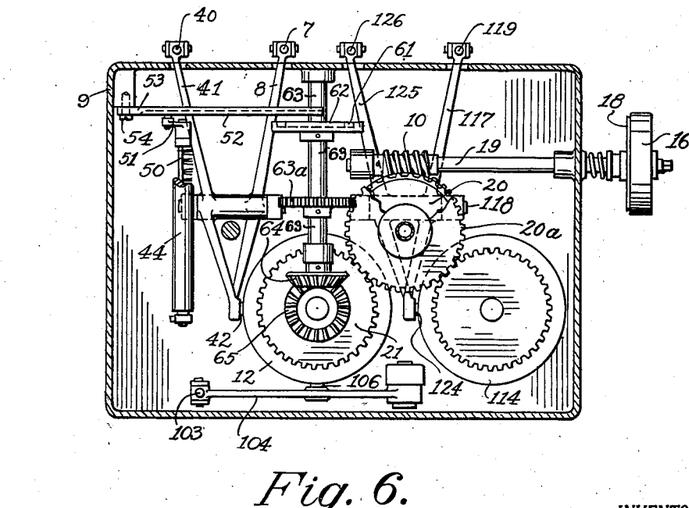

The cam 114, as appears in Fig. 6, is driven from gear 20a to make one revolution for each revolution of cam 12 which, as previously described, controls the operation of the form block F of station No. 1.

As the form F2 descends from the position shown in Fig. 1, at the beginning of the machine cycle, Fig. 12, it moves into the partially wrapped box held by carriage 66 and presses it against the platen P2 biased to the position shown by a spring. As downward movement of the form block F2 continues, the box structure slides out off the box-holding members 79, 79, 82, 82 of the box carriage which is thereupon free again to move toward station No. 1.

As carriage 66 moves to the left from the position shown in Figs. 1 and 9, the tip 141 of each of the toggle members 88 engages the stop member 142 biased by spring 143 against the rigid abutment 144; as movement of the carriage continues to the left each member 88, in effect, rotates in counterclockwise direction about its pivot to cause the box holders 82 to move to the left with respect to the carriage and after the toggle passes over center, the spring 89 thereof causes the box-holding members 82 to snap to the open position shown in Fig. 7, the limit of the toggle movement in that direction being determined by the stop 145. The stop 142 yields, when the carriage moves to the right, the engagement thereby of member 141 merely causing temporary tensioning of spring 143 which has no effect upon the position of the box-holding members, but upon reverse movement of the carriage, abutment 142 is effective, as just described, to move the box-holding members 82 away from the fixed members 79 and so adapt the carriage to receive the next assembly.

As the form block F2 continues its downward movement after receiving a partially wrapped box from the carriage, the end panels EW of the wrapper W are applied to the end walls EB of the box B (Fig. 17) by the rolls 146 of the slide units 147, 147, in general similar in construction to the slide units described and claimed in Nitsch et al. U. S. Patent #1,540,900. At a position somewhat below the rolls 146, the form block F2 temporarily comes to rest with the top edge of the box blank or box substantially in alignment with the four marginal turn-in tools 149 operated by mechanism of the aforesaid end slides 147 and the side slides 148, 148, of construction similar to slides 147, except for omission of rolls 146.

Somewhat before the form block F2 arrives at this position, movement of the auxiliary plunger is arrested under the control of cam 114 to cause separation of the two components of the form block (Fig. 12, caption No. 2 aux.").

Subsequent to inward movement of the marginal tools 149, the auxiliary form MF is permitted to descend onto turn-in tools 149 so that upon their retraction, the four margins m of the wrapper are turned inwardly and downwardly, by dropping of form MF, into adhesive engagement with the inside of the box, Fig. 18.

The four presser tools 150, operated by the mechanism of slides 147, 148, exert light pressure on all sides of the box subsequent to inward movement of the turn-in tools and exert heavier pressure after the auxiliary form block has descended to turn in the wrapper margins.

While carriage 66 is at station No. 1, the form F2 moves upwardly with the completed box until the platen P2 reaches its upper limit of travel, whereupon the stripper rods 111 remain stationary until the form F2 is moved entirely out of the box, whereupon the auxiliary plunger lifts the stripper rods—the stripper rods and form block eventually returning to the position shown in Fig. 2. This leaves the completed box resting upon platen P2, so that when carriage 66 next moves into the path of the form block F2, near the end of the machine cycle, it pushes the completed box out of the machine (Fig. 19) onto delivery table 151, Fig. 1.

In Fig. 1 all of the parts are shown in the position which they occupy at the beginning of the machine cycle, 0°, Fig. 12. To initiate the cycle of the machine, the operator depresses the pedal 152 to move it in counterclockwise direction about its pivot 153 in opposition to the bias of spring 154; thus link 155 is moved to the left, Fig. 1, to effect clockwise movement of the bell-crank lever 156, at the back of the machine, Fig. 1, having a lost-motion connection to the latch member 157. Withdrawal of the latch from the slot 158 in slidable member 159 permits spring 160 to move the driven clutch-member on shaft 19 into engagement with the driving member 16. At the end of one revolution of cam 114, the cam 161 thereon rocks the bell-crank lever 162 to relatch the parts 157 and 158 and so preclude further operation of the machine unless the operator, by holding pedal 152 down, provides for continuous operation of the machine without intervals between the cycles.

Under ordinary circumstances, the machine is not permitted to stop itself at the end of each cycle because the prolonged period of accessibility of the form block structure F in each cycle gives ample time, even for high-speed operation, for the operator to place upon the form block the box or box blank and adherent wrapper or tabs.

What I claim is:

1. A box machine comprising two movable form-block structures, sheet-operating mechanisms associated with said form-block structures respectively to perform supplemental sheet-applying operations, means operating one of said form-block structures and its associated sheet-operating mechanism and providing a prolonged period of accessibility of said form-block structure to receive an assembly comprising box structure and partially applied sheet material, and means operating in each cycle of the machine to transfer an assembly from said one of said form-block structures to the other of said form-block structures.

2. A box machine comprising form-block structure for receiving an assembly comprising box structure and sheet material partially applied thereto, sheet-operating mechanism operating during each cycle of the machine upon an assembly on said form-block structure to effect further application of the sheet material, a second form-block structure, means operating during each cycle of the machine to transfer an assembly from said first form-block structure to said second form-block structure, and sheet-operating mechanism operating during each cycle of the machine upon an assembly transferred to said second form-block structure by said transfer means.

3. A box machine comprising movable form-block structure for receiving an assembly comprising box structure and sheet material partially applied thereto, sheet-operating tools movable to apply the sheet material to sides of the box structure while on said form-block structure, means for controlling movement of said form-block structure and said tools and providing in each cycle of the machine a prolonged period of accessibility of the form-block structure to receive an assembly, a second form-block structure, means operating during each cycle of the machine to transfer an assembly from said first form-block structure to said second form-block structure, and marginal turn-in tools operating in each cycle of the machine upon an assembly transferred to said second form-block structure by said transfer means.

4. A box machine comprising a reciprocating form block, a carriage reciprocating in a path intersecting the path of said form block, a pair of box-holding members fixed to said carriage for engagement with the outside of box structure on said form block, a pair of box-holding members movable with said carriage and bodily movable toward and away from said first pair of box-holding members, and means operable when said carriage is in position to receive box structure on said form block to effect movement of said second pair of box-holding members toward said first pair of box-holding members and into engagement with the outside of said box structure.

5. A box machine comprising a reciprocating form block for receiving and moving box structure and partially applied sheet material, sheet-operating tools adjacent the path of said form block, a carriage reciprocating in a path intersecting the path of said form block beyond said tools, a pair of corner-lap tools fixed to said carriage, a second pair of corner-lap tools movable with said carriage and movable toward said first pair of corner-lap tools, and means for effecting movement of said second pair of corner-lap tools when said carriage is in position to receive box structure on said form block.

6. A box machine comprising a reciprocating form block for receiving and moving box structure and sheet material partially applied thereto, sheet-operating tools adjacent the path of said form block, a second reciprocating form block, sheet-operating tools adjacent the path of said second form block, a carriage reciprocating in a path intersecting the path of said first form block beyond said first-named tools and intersecting the path of said second form block in advance of said second-named tools, a pair of corner-lap tools fixed to said carriage, a second pair of corner-lap tools movable with said carriage and movable toward and from said first corner-lap tools, and means effecting movement of said second corner-lap tools toward said first corner-lap tools as said carriage moves into the path of said first form block and for effecting reverse movement of said second corner-lap tools as said carriage moves away from the path of said second form block.

7. A box machine comprising a reciprocating form block for receiving and moving box structure and sheet material partially applied thereto, sheet-operating tools adjacent the path of said form block, a carriage reciprocating in a path intersecting the path of said form block beyond said tools, a pair of corner-lap tools fixed to said carriage, a second pair of corner-lap tools movable with said carriage and movable toward said first pair of corner-lap tools, and an abutment adjacent the path of said carriage for effecting movement of said second pair of corner-lap tools toward said first pair of corner-lap tools as said carriage moves into the path of said form block.

8. A box machine comprising a reciprocating form block for receiving and moving unstayed box structure and sheet material partially applied thereto, sheet-operating tools adjacent the path of said form block, tools pivotally mounted adjacent said path for holding walls of said unstayed box structure against said form block, a carriage movable to intersect the path of said form block for reception of box structure from said form block, corner-lap tools on said carriage, and means for swinging said holding tools toward said form block prior to operation of said corner-lap tools and moving said holding tools in reverse direction prior to movement of said carriage from said path.

9. A box machine comprising a reciprocating form block for receiving and moving unstayed box structure and sheet material partially applied thereto, sheet-operating tools adjacent the path of said form block, tools pivotally mounted adjacent said path for holding walls of said unstayed box structure against said form block, and a member connecting said tools movable in one direction to swing them toward said path and movable in reverse direction to swing said holding tools from said path.

10. A box machine comprising a reciprocating form block for receiving and moving unstayed box structure and sheet material partially applied thereto, sheet-operating tools adjacent the path of said form block, a carriage for receiving box structure from said form block reciprocating into and out of the path of said form block beyond said tools, tools pivotally mounted adjacent said path for holding walls of said unstayed box structure against said form block, and means for swinging said holding tools toward said path when said carriage is in said path and swinging said holding tools away from said path before movement of said carriage from said path.

11. A box machine comprising a reciprocating form block, means for holding box structure to said form block, sheet-operating tools adjacent the path of said form block, a transfer device beyond said tools for receiving box structure from said form block, and means carried by said transfer device for releasing said holding means after operation of said tools.

12. A box machine comprising a reciprocating form block, members movable toward said form block to hold box structure thereto, sheet-operating tools adjacent the path of said form block, a transfer device beyond said tools for receiving box structure from said form block, and cam means carried by said transfer device for moving said holding members away from said form block after operation of said tools.

13. A box machine comprising a reciprocating form block for receiving an assembly comprising box structure and sheet material partially applied thereto, sheet-operating tools adjacent the path of said form block, a second reciprocating form block for clamping said assembly against said first form block, an assembly-receiving carriage reciprocating in a path intersecting the paths of said form blocks, corner-lap tools on said carriage, and means for effecting movements of said form blocks in unison in one direction past said tools, for effecting, when the assembly is received by said carriage, temporary cessation of movement of said form blocks for operation of said corner-lap tools, for thereafter effecting further movement of said second form block in said one direction and reverse movement of said first form block, and for effecting reverse movement of said second form block subsequent to movement of said carriage from the path of said form blocks.

14. A box machine comprising a reciprocating form block for receiving an assembly comprising box structure and sheet material partially applied thereto, sheet-operating tools adjacent the path of said form block, stripping tools beyond said sheet-applying tools, a carriage movable into the path of said form block to receive an assembly removed therefrom by said stripping tools, a second reciprocating form block for clamping the assembly against said first block during movement past said sheet-operating tools to stripping position, and means for effecting movement of said second form block to clamping position subsequent to movement of said first form block from stripping position and subsequent to movement of said carriage from the path of said form blocks.

15. A box machine comprising main and auxiliary plungers, a form block for receiving box structure and sheet material partially applied thereto carried by said main plunger, box-stripping means carried by said auxiliary plunger, sheet-operating tools adjacent the path of said form block, a carriage movable to intersect the path of said form block beyond said tools, corner-lap tools on said carriage, and means for effecting operation of said plungers to strip the box structure from said form block after operation of said sheet-operating tools and said corner-lap tools and while said carriage is in position to receive it.

16. A box machine comprising a reciprocating form block, marginal turn-in tools adjacent the path of said form block, a carriage for transporting into the path of said form block in advance of said tools a box structure having sheet material applied to, and extending beyond the top edges of, walls of the box structure, a pair of box-holding members fixed to said carriage, a pair of box-holding members on said carriage movable toward and from said first pair of box-holding members, and means for moving said second pair of box-holding members away from said first pair of holding members during movement of said carriage away from the path of said form block.

17. A box machine comprising a reciprocating form block, sheet-operating tools adjacent the path of said form block, a carriage for transporting into the path of said form block in advance of said tools a box structure and partially applied sheet material, relatively movable box-holding tools on said carriage, toggle mechanism for effecting separation of said holding tools as said carriage moves away from said path, and stripping means for removing box structure from said form block into position for ejectment by said carriage as it moves toward said path.

18. A box machine comprising a reciprocating form block for receiving an assembly comprising box structure and partially applied sheet material, sheet-applying tools adjacent the path of said form block, operating means for said form block providing at the beginning of the cycle of the machine a prolonged period of accessibility to receive said assembly, a second form block, sheet-applying tools, supplemental to said first-named tools, adjacent the path of said second form block, operating means for said second form block providing for its movement in a period of the machine cycle dephased with respect to the period of movement of said first form block, a carriage movable to transfer an assembly from said first form block to said second form block, and operating means for said carriage effecting its movement into the path of said first form block subsequent to operation of said first-named sheet-applying tools and into the path of said second form block after operation of said second-named sheet-applying tools.

19. A box machine comprising two reciprocating form blocks, sheet-operating mechanisms adjacent the paths of said form blocks to perform supplemental sheet-applying operations, a carriage reciprocating alternately to intersect the path of one of said form blocks beyond its associated sheet-operating mechanism and to intersect the path of the other of said form blocks in advance of its associated sheet-operating mechanism, stripping means associated with said one of said form blocks operative to strip box structure therefrom while said carriage is in its path, and stripping means associated with the other of said form blocks operative to strip box structure therefrom before movement of said carriage into its path.

20. A box machine comprising a reciprocating form block, a carriage reciprocating in a path intersecting the path of said form block, a pair of corner-lap tools fixed to said carriage, a pair of corner-lap tools movable with said carriage and movable with respect to said first pair of corner-lap tools, and means for effecting movement of said second pair of corner-lap tools when said carriage is in position to receive box structure on said form block.

21. A box machine comprising two form-block structures, corner-lap tools for operating upon a box and sheet assembly while on one of said form-block structures, marginal turn-in tools for operating upon the assembly while on the other of said form-block structures, and a reciprocating carriage operating in each cycle of the machine to transfer an assembly from said one of said form-block structures to the other of said form-block structures.

22. A box machine comprising two vertically reciprocating form-block structures, corner-lap tools for operating upon a box and sheet assembly while on one of said form-block structures, supplemental sheet-applying tools adjacent the path of the other of said form-block structures, and a carriage for receiving an assembly from said one of said form-block structures substantially at the bottom of its stroke and for transferring the received assembly to the other of said form-block structures substantially at the top of its stroke.

23. A box machine comprising a reciprocating form-block for receiving near one end of its stroke an assembly comprising unstayed box structure and sheet material partially applied thereto, sheet-applying tools for operating upon the assembly while near said end of said stroke, corner-lap tools for operating upon the assembly while substantially at the other end of said stroke, pivotally mounted tools disposed along the path of said form-block structure intermediate said sheet-applying tools and said corner-lap tools to hold walls of the unstayed box structure against said form-block while free of said sheet-applying tools and said corner-lap tools, and means for swinging said holding tools toward and away from said path.

24. A box machine comprising a form-block for receiving in succession assemblies each comprising box structure and sheet material partially applied thereto, the length and width of the block being fixed and corresponding to length and width of the box structures and the thickness of the block being fixed and independent of the depth of the box structure, a second form-block whose length, width, and thickness correspond to the length, width, and depth of the box structures, marginal turn-in tools for operating upon the assemblies while on said second form-block, tools for performing preliminary sheet-applying operations upon the assemblies while on said first form-block, and mechanism for transferring the assemblies in succession from said first form-block to said second form-block.

25. In a box machine, a transfer carriage, box-holding members mounted on said carriage for movement with respect thereto, toggle mechanism on said carriage for operating said holding members, means for reciprocating said carriage, and structure adjacent the path of said carriage for engaging and actuating said toggle-mechanism to move said box-holding members toward and from their box-holding position for different positions of said carriage.

26. In a box machine, a transfer carriage movable toward and from a box-receiving position, box-holding members mounted on said carriage for movement with respect thereto, toggle mechanism on said carriage for operating said holding members, stop structure adjacent the path of said carriage for engaging said toggle mechanism during movement of said carriage to said box-receiving position to move said box-holding members to their box-receiving position and yielding upon engagement with said toggle mechanism during movement of said carriage from its said box-receiving position, and stop structure adjacent the path of said carriage for engaging said toggle mechanism to effect movement of said box-holding members from their box-receiving position to their box-holding position.

27. A box machine comprising a reciprocating form-block, a reciprocating carriage comprising a pair of slidable members each having a rack thereon, corner-lap tools on each of said slidable members for operating upon box-structure on said form-block, a drive shaft, gears rotatable with and slidable axially of said shaft in mesh with said racks, guide members for said slidable members each movable axially of said shaft with one of said gears to accommodate said carriage to box structures of different width, and means for oscillating said shaft to move said carriage into and out of the path of said form-block.

28. A box machine comprising two vertically reciprocating form-blocks for in succession receiving assemblies each comprising box structure and partially applied sheet material, sheet-applying tools adjacent the paths of said form-blocks for performing supplemental sheet-applying operations, a horizontally reciprocating carriage for receiving assemblies from one of said form-blocks when substantially at the bottom of its stroke and transferring it to the other of said form-blocks when substantially at the top of its stroke, and cams in the base of said machine below said form-blocks and said carriage for effecting reciprocation of said form-blocks and of said carriage.

WALTER T. BAILEY.